United States Patent
Beinschob

(10) Patent No.: US 10,643,349 B2
(45) Date of Patent: May 5, 2020

(54) METHOD OF CALIBRATING A CAMERA AND A LASER SCANNER

(71) Applicant: SICK AG, Waldkirch (DE)

(72) Inventor: Patric Beinschob, Waldkirch (DE)

(73) Assignee: SICK AG, Waldkirch (DE)

( * ) Notice: Subject to any disclaimer, the term of this patent is extended or adjusted under 35 U.S.C. 154(b) by 98 days.

(21) Appl. No.: 15/950,589

(22) Filed: Apr. 11, 2018

(65) Prior Publication Data
US 2018/0315214 A1 Nov. 1, 2018

(30) Foreign Application Priority Data
Apr. 27, 2017 (DE) .................. 10 2017 109 039

(51) Int. Cl.
*G06T 7/80* (2017.01)
*G01S 17/89* (2020.01)
(Continued)

(52) U.S. Cl.
CPC .............. *G06T 7/80* (2017.01); *G01S 7/4808* (2013.01); *G01S 7/4972* (2013.01); *G01S 17/42* (2013.01);
(Continued)

(58) Field of Classification Search
CPC .. G06T 7/50; G06T 7/536; G06T 7/55; G06T 2207/00; G06T 2207/10028
(Continued)

(56) References Cited

U.S. PATENT DOCUMENTS

| 8,290,305 B2 | 10/2012 | Minear et al. |
| 2009/0039157 A1* | 2/2009 | Reichenbach ..... G06K 7/10792 235/436 |

(Continued)

FOREIGN PATENT DOCUMENTS

| DE | 102004033114 A1 | 1/2006 |
| DE | 102008032216 A1 | 1/2010 |

(Continued)

OTHER PUBLICATIONS

Pandey, Gaurav, et al. "Extrinsic Calibration of a 3D Laser Scanner and an Omnidirectional Camera." IFAC Proceedings vols. 43.16 (2010), pp. 336-341.

(Continued)

*Primary Examiner* — Dwayne D Bost
*Assistant Examiner* — Stephen M Brinich
(74) *Attorney, Agent, or Firm* — Nath, Goldberg & Meyer; Jerald L. Meyer

(57) ABSTRACT

A method of calibrating a camera and a laser scanner for their sensor fusion is provided whereby the camera records a camera image of a scene and the laser scanner at least partly scans the scene with a scanning beam and records a remission image from the respective angular position of the scanning beam and from the intensity determined at the angular position of the scanning beam remitted from the scene, wherein an offset and/or a relative orientation between the camera and the laser scanner is determined from a comparison of the camera image and the remission image. Distances with respect to the remission image are here also determined by the laser scanner and distances with respect to the camera image are reconstructed; and in that a correspondence search of corresponding features in the camera image and in the remission image is carried out in three-dimensional space for the comparison.

20 Claims, 2 Drawing Sheets

Figure 1:
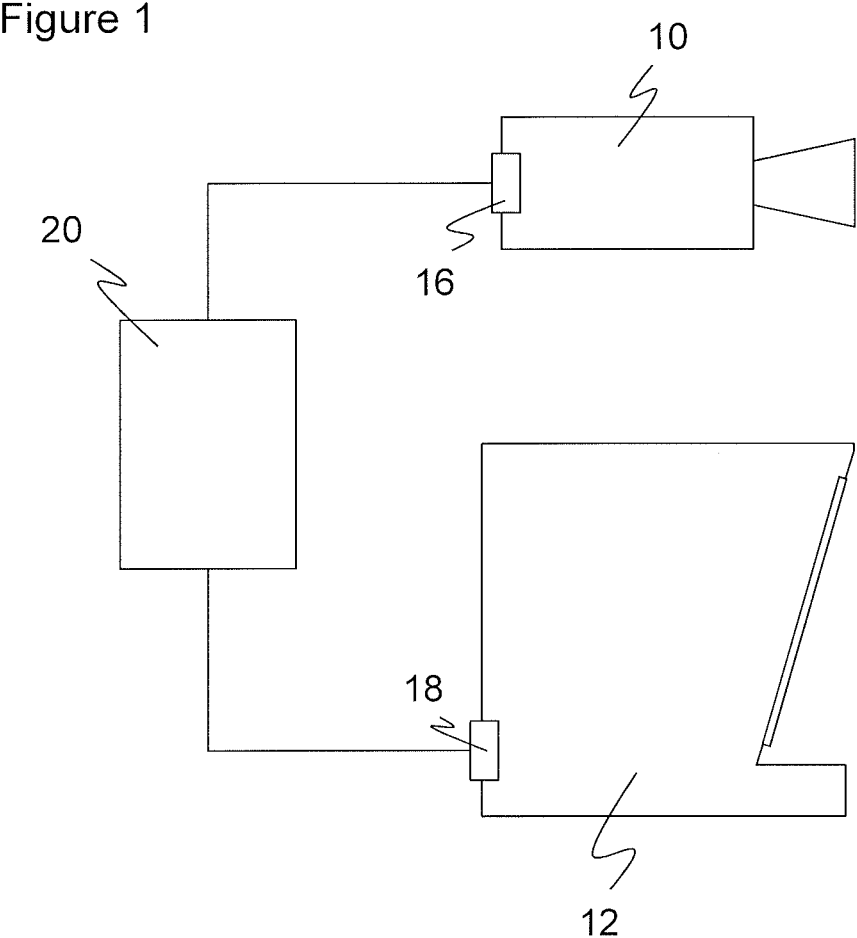

(51) Int. Cl.
   *G01S 7/497* (2006.01)
   *G01S 17/42* (2006.01)
   *G06T 7/73* (2017.01)
   *G01S 7/48* (2006.01)
   *G01S 17/86* (2020.01)

(52) U.S. Cl.
   CPC .............. *G01S 17/86* (2020.01); *G01S 17/89* (2013.01); *G06T 7/74* (2017.01); *G06T 2207/30244* (2013.01)

(58) Field of Classification Search
   USPC ........ 382/106–107, 100, 209–210, 312, 318, 382/181
   See application file for complete search history.

(56) References Cited

U.S. PATENT DOCUMENTS

| | | | | |
|---|---|---|---|---|
| 2009/0086014 A1* | 4/2009 | Lea | ........................ | G01C 11/00 348/25 |
| 2015/0177370 A1* | 6/2015 | Trummer | .............. | G01S 17/023 356/5.01 |
| 2016/0070981 A1 | 3/2016 | Sasaki et al. | | |
| 2016/0252619 A1* | 9/2016 | Markendorf | .......... | G01S 17/023 356/3.01 |

FOREIGN PATENT DOCUMENTS

| DE | 102011056948 A1 | 6/2013 |
| DE | 102015118874 A1 | 5/2017 |
| WO | 2013/155564 A1 | 10/2013 |
| WO | 1965225 A2 | 10/2013 |

OTHER PUBLICATIONS

Park, Yoonsu, et al. "Calibration Between Color camera and 3D LIDAR instruments with a polygonal planar board." 15 Sensors 14.3, (2014), pp. 5333-5353.

Scaramuzza, Davide, et al. "Extrinsic Self Calibration of a Camera and a 3D Laser Range Finder from Natural Scenes." Intelligent Robots and Systems, 2007. IROS 2007.

German Office Action dated Nov. 29, 2017 in corresponding German Patent Application No. 102017109039.8.

* cited by examiner

METHOD OF CALIBRATING A CAMERA AND A LASER SCANNER

The invention relates to a method of calibrating a camera and a laser scanner for their sensor fusion in which the camera records a camera image of a scene and the laser scanner at least partly scans the scene with a scanning beam and records a remission image from the respective angular position of the scanning beam and from the intensity determined at the angular position of the scanning beam remitted from the scene, wherein an offset and/or a relative orientation between the camera and the laser scanner is determined from a comparison of the camera image and the remission image. The invention further relates to a corresponding system composed of a camera and a laser scanner, and an evaluation unit that is configured to calibrate the camera and the laser scanner.

In a laser scanner, a sensing beam or scanning beam scans a zone and evaluates the remitted or reflected light. In order also to acquire information on object distances, contours, or profiles, typically not only the presence of objects is determined, but rather simultaneously also their distance. Such distance-measuring laser scanners work in accordance with a time of flight principle in which the time of flight from the scanner into the scene and back is measured and distance data are calculated using the speed of light. Two types of time of flight method are widespread. In phase-based methods, the light transmitter modulates the scanning beam and the phase between a reference and the received scanning beam is determined. Pulse-based methods impart a significant pattern onto the scanning beam, for example a narrow pulse of only a few nanoseconds duration, and determine the reception time of this pattern. In a generalization called a pulse averaging method, a plurality of pulses or a pulse sequence is transmitted and the received pulses are statistically evaluated.

Known laser scanners have a rotating mirror or a polygon mirror wheel to periodically scan a monitoring plane or a segment of a monitoring plane. Alternatively, an active measuring head with a light transmitter and a light receiver rotates. 3D laser scanners detect a three-dimensional spatial zone and not just an area. This can be implemented by movement about a further axis, either in a pivot movement or in a complete revolution movement. In DE 10 2008 032 216 A1, for example, the total scanning unit with the transmitter, receiver, and rotating mirror is arranged on a deflection plate. EP 1 965 225 A2 discloses the most varied possibilities of combining the rotational movement of a laser scanner with an additional tilt movement.

Cameras and laser scanners are sensors that complement one another very well. While the laser scanner is used to scan the geometry of a scene, the camera can detect the visual impression of the scene and can thus detect properties such as lighting, materials, or textures. It is frequently desired to combine, for example to fuse, both sensor data sources in order thus to digitize the surroundings in a true-to-life manner. The optical impression and the geometry can thereby be reproduced on computers in order, for example, to no longer have to carry out planning work on site.

The so-called extrinsic matrix, that is the transformation between the optical center of the laser scanner and the camera, has to be known for a correct sensor fusion. This transformation generally comprises the translation into three spatial dimensions and the three angles of rotation and therefore has six degrees of freedom. The determination of the transformation is called extrinsic calibration. It can also be described as a determination of the conversion rule between the respective local coordinate systems or into a global coordinate system for which the term registration is also customary.

The academic literature on extrinsic calibration describes techniques that have to start from a defined calibration object or have to detect the object from a plurality of perspectives to estimate the transformation.

In the paper Pandey, Guarav, et al. "Extrinsic calibration of a 3d laser scanner and an omnidirectional camera." IFAC Proceedings Volumes 43.16 (2010): 336-341, a precisely defined chessboard is used that has to be seen from different perspectives. In accordance with the article Park, Yoonsu, et al. "Calibration between color camera and 3D LIDAR instruments with a polygonal planar board." Sensors 14.3 (2014): 5333-5353, a precisely defined diamond-shaped object is used instead of a chessboard as the calibration target. Calibration objects, no matter how precisely defined on their generation, can change over time, for instance by wear of their shape or by losing color. An exactly defined calibration object can be difficult to obtain or can only be obtained at high cost or it is currently not available when it is, for example, needed during a measurement campaign.

In accordance with Scaramuzza, Davide, Ahad Harati, and Roland Siegwart. "Extrinsic self calibration of a camera and a 3d laser range finder from natural scenes." Intelligent Robots and Systems, 2007. IROS 2007. IEEE/RSJ International Conference on. IEEE, 200, a calibration object is admittedly not used. Manual correspondences have to be defined, however, that are used for transformation estimation, which means a high effort and/or cost and is also subject to error in dependence on experience.

A conceptually very simple procedure comprises a simple manual testing of the six translational and rotational parameters until the geometrical data of the laser scanner and the camera data are optically congruent. This is, however, typically very imprecise and difficult to reproduce so that the estimated transformation has a small repetition accuracy and the precision is also not quantifiable.

WO 2013/155564 A1 discloses an integrated system of a 3D laser scanner and an image sensor. Attention is admittedly drawn to the necessity of calibrating both with respect to one another, but use is then only made of the already discussed academic literature for the specific procedure.

A method of registering a 3D point cloud and two-dimensional image data is described in U.S. Pat. No. 8,290, 305 B2. A possibility is mentioned in the introduction there of measuring the respective reflected intensity of the scanning beam of a LIDAR system and thereby recording a 2D image by the LIDAR that is more similar to a 2D camera image than the 3D measurement data. The approach of using this 2D image as the basis for the registration is then, however, immediately discarded due to a large number of disadvantages.

Against this background, it is the object of the invention to improve the explained calibration.

This object is satisfied by a method of calibrating a camera and a laser scanner and by a corresponding system in accordance with the respective independent claim. As the starting point, the camera records a camera image of a scene. The laser scanner scans the scene and measures the respective intensity of the remitted or reflected scanning beam. In the course of the scanning movement, an image can thus likewise be compiled that is called a remission image. An offset or an orientation of the camera and laser scanner with respect to one another is then determined from a comparison of the camera image and the remission image. This determination of a transformation rule between the local coordinate systems is also called registration or extrinsic calibration.

The invention now starts from the basic idea of carrying out a calibration despite the only two-dimensional starting data in the camera image and remission image on the basis of a correspondence search in three-dimensional space. Distance values with respect to the remission image are present based on the measurement of the laser scanner. Distances are reconstructed for the camera image. 3D-3D correspondences can thus then be found, i.e. corresponding features such as pixel groups, edges or corners, special contrasts and the like. A complementary or preceding two-dimensional correspondence search in 2D is, however, not precluded.

The invention has the advantage that a simple, very largely automatic extrinsic calibration is made possible. It delivers reproducible results, with the solution also being able to be evaluated by a quality criterion. No calibration object is required for this. In each case, a static camera image and remission image is sufficient; the method manages without any movement of the camera or laser scanner. It is important to point out here that the camera image and the remission image are initially not particularly similar, particularly with large fields of view. This supports the statements of the above-cited U.S. Pat. No. 8,290,305 that a calibration on the basis of the camera image and the remission image is initially unsatisfactory. This is also due to the fact, in addition to the visible differences in the starting images, that 2D-2D correspondence pairs only delivery weak contributions to the correspondence estimate. The invention shows that 3D-3D correspondences can full well be found, which results in decisively better results and a stable transformation estimate is thus possible.

The camera is preferably a 2D camera. Correspondences could be searched for directly in three-dimensional space with a 3D camera using the respective point clouds of the camera and the laser scanner.

The distances in the camera image are preferably reconstructed with the aid of the distances of the remission image. Since the camera and the laser scanner have at least partly recorded the same scene, the distances are known in principle by the measurement with the laser scanner. They can therefore be transferred to the camera image as soon as, for example, it is known as part of a correspondence search which distance belongs to which zone or to which feature of the camera image.

First features are preferably determined in the camera image and predefined distances are projected. This projection preferably uses the intrinsic matrix or the intrinsic parameters of the camera that are in turn known or are determined by an intrinsic calibration known per se. Projection is even more preferably made onto the unit sphere. The distances thereby acquired are not the actual distances, but are at least suitable for a first step of a correspondence search in three-dimensional space. It is not precluded to use a different radius or even another area embedded in three-dimensional space instead of the unit sphere; however, distortion rather than better results is more to be expected of this.

Two features are preferably determined in the remission image and are projected onto predefined distances, in particular onto the unit sphere. The actual distances for the second features are known on the basis of the measurement of the laser scanner. They are, however, initially ignored here and predefined distances are used. The projection onto the unit sphere is very simple from a calculation aspect because the distances are measured on radial beams and can be set directly to one. As already with the first features, a different radius or even a different area can be used instead of the unit sphere; however, first and second features should be projected onto the same area. The measured distances are preferably not discarded, but rather stored for later steps.

A first correspondence search is advantageously carried out in three-dimensional space between the first features and the second features. The first correspondence search takes place on the basis of artificial distances created by the projection, but is also a correspondence search in three-dimensional space. Only unambiguous correspondence pairs are preferably permitted and/or no further features may be present in the surroundings of a correspondence pair. The correspondences found are therefore filtered in order only to calibrate with reference to particularly reliable correspondences. For this purpose, therefore, correspondences should be recognized in both directions and, to reduce incorrect associations, no further features should be able to be found in the direct surroundings.

The distance of the associated second feature measured by the laser scanner is preferably assigned to the first features of a correspondence pair to acquire corrected first features. The correspondence means that according to the current assumption the camera has recorded the same feature as the laser scanner. The measured distance of the laser scanner is therefore a better estimate than the fixed initial distance on the unit sphere. The corrected first features are consequently genuine 3D features that are no longer only based on artificial distances.

A second correspondence search is preferably carried out in three-dimensional space between the corrected first features and the second features. On this repeat correspondence search, the features are no longer projected onto a predefined distance, but rather use the measured distance. In the case of the second features, this distance was measured directly by the laser scanner. The corrected first features have taken over the distance from the corresponding second feature. It is consequently a genuine 3D correspondence search in which the proximity relationships also come fully into effect in the distance direction.

The first features and the second features of the found correspondence pairs are preferably places over one another as best as possible by an optimization, in particular a non-linear optimization, of the displacement and/or orientation. Powerful algorithms are available for this and with an optimum coincidence the offset and the orientation are the transformation parameters sought for the calibration or sensor fusion.

A quality of coincidence is advantageously calculated. The optimization procedures usually also deliver such a quality, for instance in the form of a covariance matrix. It can also be predefined and can, for example, be used as the abort criterion of the non-linear optimization. It is thus known how large the accumulated residual error of the features placed over one another still is, for example. How good the underlying correspondences were can also be evaluated.

The laser scanner is preferably a 3D laser scanner. The laser scanner therefore not only scans by a pivot movement or rotational movement of a plane, but also varies the pitch angle. The specific space curve of the scanning movement is of no interest for the invention. A 2D remission image is at least detected in this manner that is particularly easily comparable with the 2D camera image.

The scene is preferably left as it is for the calibration. The calibration therefore takes place using natural features that are present in the scene from the start. This further simplifies the procedure for the user. No calibration object in particular has to be arranged in the scene and accordingly no exact specifications with respect to dimensions and shape have to be observed or predefined for the method either.

At least one object having a desired remission behavior is alternatively arranged in the scene for the calibration to increase the contrast. This still does not mean a calibration object having special properties or patterns. It is only important to provide sufficient contrast and thus potential features with which correspondences can be formed in a structureless scene, for instance in an empty room with white walls. Simple everyday objects that are available everywhere, for example cardboard or photo paper, are sufficient for this purpose. Furthermore no special dimensions have to be observed nor does the calibration have to be parameterized therewith.

The system in accordance with the invention has the camera, the laser scanner, and an evaluation unit in which the method for calibration runs. The evaluation unit can be implemented on any desired hardware and can also be shared as desired over a camera, a laser scanner and/or an external device such as a notebook or a smartphone that is a universal external device or one especially connected for this purpose. Only a certain computing power and access to the raw data of the camera and the laser scanner are required for this.

Figure 2:
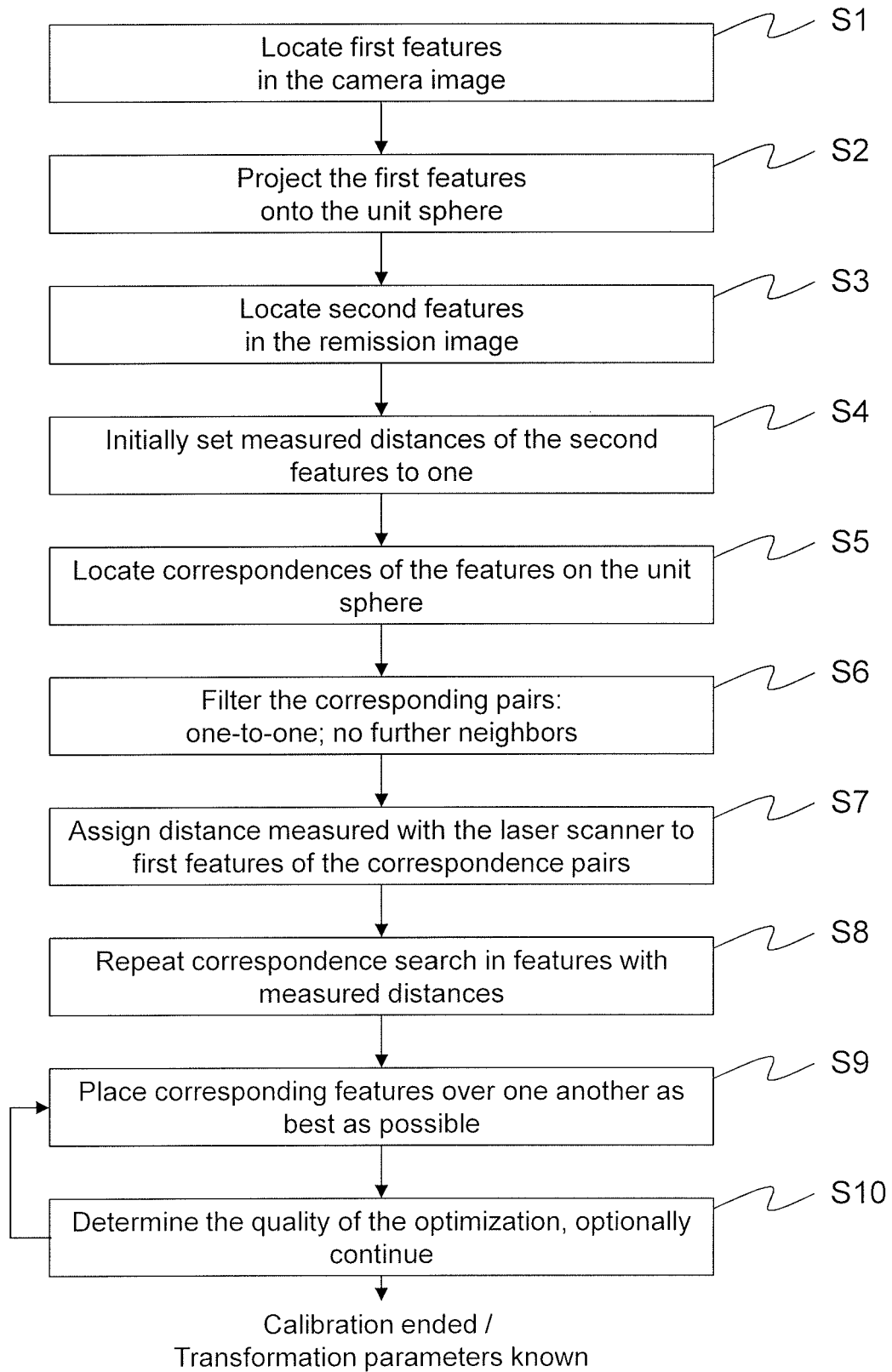

The invention will be explained in more detail in the following also with respect to further features and advantages by way of example with reference to embodiments and to the enclosed drawing. The Figures of the drawing show in:

FIG. 1 a schematic representation of an arrangement of a camera, a laser scanner, and an evaluation unit for calibrating for sensor fusion; and FIG. 2 an exemplary flowchart of a calibration of the camera and the laser scanner for their sensor fusion.

FIG. 1 shows a schematic representation of an arrangement of a camera 10 and a laser scanner 12. The camera 10 is a color camera or a monochrome camera, possibly also outside the visible camera such as with an IR camera that records a two-dimensional camera image of a scene 14.

The operating principle of the laser scanner 12 is known per se and has been described in the introduction. Which specific setup is selected for the laser scanner 12 is not relevant to the invention. The laser scanner 12 is, however, preferably a 3D laser scanner to obtain a detection zone comparable with the field of view of the camera 10.

The laser scanner 12 likewise detects the scene 14. There is an overlap here between the field of view of the camera 10 and the detection zone of the laser scanner 14 that is preferably large or even complete since the data can only be used for a calibration there and later in operation contribute diversely to a fusion. In the non-overlapping zones, however, a data fusion is also possible in the sense that at least the camera 10 or the laser scanner 12 still contributes data at the margins. The laser scanner 12 typically has the broader detection zone, but the camera 10 can likewise detect wide field of view by panorama optics and the like.

The laser scanner 12 measures distances as described in the introduction. At the same time, however, the laser scanner 12 is also able also to determine the intensity of the scanning beam received again in addition to the distance measurement. A remission image can thereby be gradually be built up in the course of the scanning movement. Since the respective S4 angular positions are known, the measured intensities can be placed at the correct point as pixels of the remission image. If the laser scanner 12 does not only scan one plane, but, as a 3D laser scanner, also varies the pitch angle, the remission image is a two-dimensional image. The recording of the camera image and of the remission image takes place as simultaneously as possible for the subsequently explained calibration, but at least such that the scene can be considered as quasi-static because otherwise calibration errors result.

The camera 10 is connected to an evaluation unit 20 via a camera interface 16 and the laser scanner 12 is connected via a laser scanner interface 18. It can be a high-ranking control, a notebook or the like here. The evaluation unit 20, that is external here, can alternatively be provided at least partly internally in the camera 10 and/or laser scanner 12.

The evaluation unit 20 receives the camera image, the remission image, and the 3D point cloud of the distances measured by the laser scanner 12 or corresponding raw data in any desired processing stage to acquire these data itself. A calibration of the camera 10 and of the laser scanner 12 thus then takes place as described in the following. It is thus known in operation how the data of the camera 10 and of the laser scanner 12 can be fused with one another while taking account of mutual offset and/or tilt.

FIG. 2 shows a flowchart of the calibration of the camera 10 and the laser scanner 12. It is an example in this respect. By no means all the steps in particular have to be implemented; a high number of the named steps are rather purely optional.

In a step S1, the camera image is examined for distinctive points, for example points with a high contrast. Some known algorithm features for this purpose are Harris-Corner detection and further feature detectors such as SIFT (Scale-Invariant Feature Transform), SURF (Speeded Up Robust Features), ORB (Oriented FAST and rotated BRIEF) or similar. A set of first features of the camera image can thereby be determined, with at least three elements being required for the further procedure.

In a step S2, the first features are projected from the two-dimensional camera image into three-dimensional space. This is possible when the intrinsic matrix of the camera 10 is known or is determined in a corresponding calibration, that is in particular the position of the optical center within the camera 10. However, without knowledge of the distance, projection can only take place into fixed, non-actual distances, preferably onto the unit sphere.

In a step S3, distinctive points are also looked for in the remission image. The procedure corresponds to step S1 and the result is a set of two features of the remission image.

In a step S4, the second features are set to distances corresponding to the first features. The actual distance that the laser scanner 12 had measured would per se also be known for the second features. However, first and second features should be comparable for the further procedure, preferably both on the unit sphere.

In a step S5, coincidences between the first features and the second features are now looked for. Correspondence pairs can be determined in a manner known per se, for example, by a nearest neighbor search. This step produces a substantial improvement because the original camera and remission images in no way correspond to one another in a purely visual manner. This applies above all with large angles of view, for instance when it is a setup rotating about the optical axis and the camera 10 and the laser scanner 12 each have a field of view of up to 180° or even more.

In a step S6, the found correspondence pairs are still filtered so that only particularly high-quality correspondences remain. Possible demands are one-to-one correspondence pairs or that the features used have no further features in their respective nearer neighborhood. If the features within an image are far enough away from one another, the association between the camera 10 and the laser scanner 12 is one-to-one. The spacing of the features in the image is associated with the size of the object in the calibration space and a one-to-oneness can be manually forced under certain circumstances in that larger objects are introduced into the scene 14.

In a step S7, the distance of the associated second feature of the remission image from correspondence pairs is respectively assigned to the first features of the camera image. The distance for the second feature is known by a measurement of the laser scanner 12; the artificial fixing in step S4 no longer takes place. The features thereby no longer lie on the unit sphere, but in two-dimensional space in accordance with the measurement and the assignment.

In a step S8, a repeat correspondence search is preferably carried out using a tighter distance criterion on this basis. This produces an improved correspondence list and is also easier to reproduce in a visualization than the neighborhood on the unit sphere.

In a step S9, the found correspondences in three-dimensional space are used to estimate the extrinsic transformation using a non-linear optimization procedure. An exemplary possibility is an iterative closest point method. However, a formulation as a linearized balancing problem is also conceivable that is solved via Gauss-Newton-on-manifolds. Problems with Euclidean angles can thereby also be avoided ("gimbal lock"). Robust optimization techniques that are tolerant toward correspondence errors such as "robust kernels" or M-estimators are likewise conceivable.

In a step S10, a quality criterion for the determined solution can also be mathematically derived using the correspondences and the back projection, for instance via a covariance matrix. It is also conceivable to repeat the step S9 or earlier steps if the quality criterion is still unsatisfactory. False solutions can at least be recognized as such and can be avoided in use.

The transformation rule acquired as a result generally comprises the offset and the orientation with three degrees of freedom of the translation and three degrees of freedom of the rotation, that is the full mutual 6D position. Conditions can, however, also be present that fix degrees of freedom or make them uninteresting from the start where it is sufficient only to determine a corresponding part of the transformation rule in a few dimensions. It is possible to freely select whether the common origin for the transformation is in the camera 10, the laser scanner 12, or at a different position. It is also equivalent to determine a conversion between the two local coordinate systems of the camera 10 and laser scanner 12 or into a global coordinate system.

The scenery 14 can already have sufficient contrast without any measure to locate features in the camera image and in the remission image and thus to carry out the calibration so that the introduction of further objects is unnecessary. If, however, the scene 14 is low in contrast, which is already initially recognized or possibly only with an insufficient quality criterion in step S10, simple objects such as white, black, or colored cardboards can be arranged in the scene 14. A larger white cardboard under a black cardboard provides a reliable high contrast. If the camera 10 records in the IR spectrum, the contrast should also be present there, which would, however, also be ensured by said example. The object or objects are arranged in the scene 14 visible for the camera 10 and the laser scanner 12. Calibration objects having special patterns and dimensions are not necessary in any case, even though they would naturally likewise be suitable with their contrasts.

The invention claimed is:

1. A method of calibrating a camera and a laser scanner for their sensor fusion, the method comprising the steps of:
   recording a camera image of a scene with the camera;
   at least partly scanning the scene with a scanning beam of the laser scanner;
   recording a remission image from the respective angular position of the scanning beam and from the intensity determined at the angular position of the scanning beam remitted from the scene;
   determining at least one of an offset and a relative orientation between the camera and the laser scanner from a comparison of the camera image and the remission image;
   determining distances with respect to the remission image by the laser scanner;
   reconstructing distances with respect to the camera image; and
   carrying out a correspondence search of corresponding features in the camera image and in the remission image in three-dimensional space for the comparison.

2. The method in accordance with claim 1, wherein the distances in the camera image are reconstructed with the aid of the remission image.

3. The method in accordance with claim 1, wherein first features are determined in the camera image and are projected onto predefined distances.

4. The method in accordance with claim 3, wherein the first features are projected onto a unit sphere.

5. The method in accordance with claim 1, wherein second features are determined in the remission image and are projected onto predefine distances.

6. The method in accordance with claim 5, wherein the second features are projected onto a unit sphere.

7. The method in accordance with claim 5, wherein first features are determined in the camera image and are projected onto predefined distances and wherein a first correspondence search is carried out in three-dimensional space between the first features and the second features.

8. The method in accordance with claim 7, wherein the distance of the associated second feature measured by the laser scanner is assigned to the first features of a correspondence pair to acquire corrected first features.

9. The method in accordance with claim 8, wherein a second correspondence search is carried out in three-dimensional space between the corrected first features and the second features.

10. The method in accordance with claim 1, wherein only one-to-one correspondence pairs are permitted and/or no further features may be present in the surroundings of a correspondence pair.

11. The method in accordance with claim 10, wherein the distance of the associated second feature measured by the laser scanner is assigned to the first features of a correspondence pair to acquire corrected first features.

12. The method in accordance with claim 11, wherein a second correspondence search is carried out in three-dimensional space between the corrected first features and the second features.

13. The method in accordance with claim 1, wherein the corresponding features are placed over one another as best as possible by an optimization of at least one of the offset and the orientation.

14. The method in accordance with claim 13, wherein the corresponding features are placed over one another as best as possible by a non-linear optimization.

15. The method in accordance with claim 13, wherein a quality of the optimization is calculated.

16. The method in accordance with claim 1, wherein the laser scanner is a 3D laser scanner.

17. The method in accordance with claim 1, wherein the scene is not altered prior to the steps of recording the camera image and at least partly scanning the scene.

18. The method in accordance with claim 17, wherein the scene is not altered prior to the steps of recording the camera image and at least partly scanning the scene by addition of a calibration object.

19. The method in accordance with claim 1, wherein at least one object having a desired remission behavior is arranged in the scene to increase contrast prior to the steps of recording the camera image and at least partly scanning the scene.

20. A system composed of a camera and a laser scanner, and an evaluation unit that is configured to calibrate the camera and the laser scanner by using a method of calibrating the camera and the laser scanner for their sensor fusion, the method comprising the steps of:

recording a camera image of a scene with the camera;

at least partly scanning the scene with a scanning beam of the laser scanner;

recording a remission image from the respective angular position of the scanning beam and from the intensity determined at the angular position of the scanning beam remitted from the scene;

determining at least one of an offset and a relative orientation between the camera and the laser scanner from a comparison of the camera image and the remission image;

determining distances with respect to the remission image by the laser scanner;

reconstructing distances with respect to the camera image; and carrying out a correspondence search of corresponding features in the camera image and in the remission image in three-dimensional space for the comparison.

\* \* \* \* \*